United States Patent
Will

[11] 3,941,016
[45] Mar. 2, 1976

[54] LOAD AND SPEED DEPENDENT GEAR CHANGE HYDRAULIC PRESSURE GENERATOR

[75] Inventor: Gerhard Will, Beutelsbach, Germany

[73] Assignee: Robert Bosch G.m.b.H., Gerlingen-Schillerhohe, Germany

[22] Filed: Apr. 29, 1974

[21] Appl. No.: 464,809

[30] Foreign Application Priority Data
May 5, 1973    Germany.................... 2322818

[52] U.S. Cl. .......................... 74/867; 74/868
[51] Int. Cl.² ........................... B60K 41/04
[58] Field of Search ............ 74/867, 868, 869, 865

[56] References Cited
UNITED STATES PATENTS
3,625,322   12/1971   Nagamutsu et al. ......... 74/752 C X
3,646,836   3/1972   Kubo et al. ................. 74/868 X

*Primary Examiner*—Benjamin W. Wyche
*Assistant Examiner*—John Reep
*Attorney, Agent, or Firm*—Flynn and Frishauf

[57] ABSTRACT

A pump, driven by the engine, supplies hydraulic pressure as a function of engine speed; the engine controller provides a displacement force, for example by a cam, acting on a main valve slider, or spool of the switching pressure controller. To additionally provide a speed signal to the main spool, the switching pressure line, connected to the pump, has a Venturi, diaphragm, bent tube, or other constriction therein from which a hydraulic signal representative of engine speed can be derived, which hydraulic signal is applied as a force additionally acting on the main valve slider or spool so that the spool position, and hence output switching pressure, will be representative both of engine controller position as well as of engine speed.

3 Claims, 4 Drawing Figures

LOAD AND SPEED DEPENDENT GEAR CHANGE HYDRAULIC PRESSURE GENERATOR

Cross reference to related applications: U.S. Ser. No. 299,516, filed Oct. 20, 1972, now U.S. Pat. No. 3,835,733, issued Sept. 17, 1974; U.S. Ser. No. 405,101, filed Oct. 10, 1973, now U.S. Pat. No. 3,851,285, issued Nov. 26, 1974; U.S. Ser. No. 446,140, filed Feb. 27, 1974; and U.S. Ser. No. 288,654, now U.S. Pat. No. 3,785,224 assigned to the assignee of the present invention.

The present invention relates to apparatus which provides a fluid pressure, preferably hydraulic pressure which depends on speed as well as loading in a mechanical-fluid (preferably hydraulic fluid) device, such as a vehicle transmission gearing.

A hydraulic pump driven by a variable speed engine provides a hydraulic pressure which is generally proportional to the speed of the pump, and hence to the speed of the engine. The switching pressure for a hydraulic transmission can be controlled by a pressure regulator, with pressure feedback. The valve is, for example, of the spool type, and a throttled pressure acts on the valve spool, which throttle pressure is determined by a throttle pressure control valve spool. The throttle pressure control valve spool, itself, has a force acting thereon which is representative of the switching pressure and of the throttle position of the main control throttle of the engine, for example as transferred to the spool by means of a cam.

Vehicle transmission gearings have been proposed in which the torque of the converter-turbine is simulated by the position of the throttle of the carburetor, and the speed of the engine. The throttle position is transferred by means of a flexible cable to a cam which changes the bias of a spring in a pilot controller and then so controls the valve spool or valve slider thereof that the throttled pressure of the hydraulic fluid is a function of the position of the engine throttle. The throttle position of the engine can also be transferred into a hydraulic control pressure by means of an electromagnetic pressure regulator. Engine speed, as a controlling parameter is measured by measuring fluid flow, in which the pump supplying the pressure fluid medium being driven directly from the engine. Such transmissions gear arrangements provide a throttled pressure which is proportional to engine throttle position. Complete gear change without jolts — so desirable in automatic transmissions — cannot be entirely obtained, however, by such systems or arrantements.

It is an object of the present invention to provide an improved automatic transmission system in which the switching pressure is better matched to the torque of the motor than heretofore.

SUBJECT MATTER OF THE PRESENT INVENTION

Briefly, the switching pressure line has a device located therein which generates a switching pressure, acting on the main gear or changing slider valve, and which generates a switching pressure which is additional to the pressure representative of throttle position.

In a preferred form of the invention, a diaphragm, or controlled passage is located in one of the hydraulic lines providing fluid to the main control valve. If the engine speed commands the reset force, or feedback force acting on the spool, the diaphragm or, preferably controllable constriction is located in the hydraulic line in such a manner that the pressure difference of the pressure generated by the switching pressure line and the pressure representative of throttle position act on the main spool of the main control valve in such a manner that this differential pressure changes the position of the main spool valve. Preferably, a control slider is provided in the pressure regulator which has one control surface on which the control pressure is applied, this pressure acting counter the throttle pressure on the main slider spool, assisted by the force of a spring. In this preferred form of the invention, the speed of the engine can easily control the return or feedback force acting on the main slider.

The invention will be described by way of example with reference to the accompanying drawings, wherein.

Figure 1:
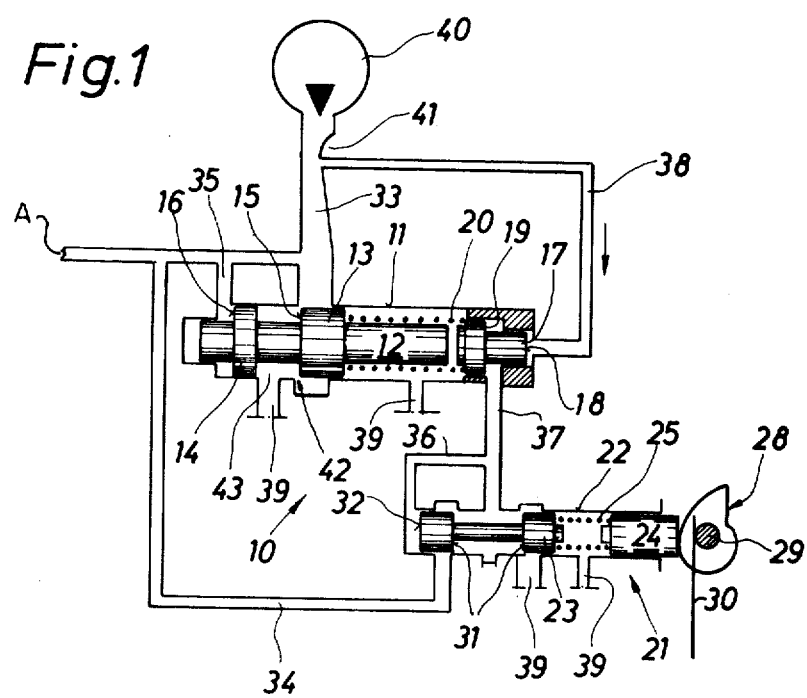
FIG. 1 is a highly schematic illustration of a hydraulic control system for gear shifting in which a Venturi tube is used.

Embodiment of FIG. 1: A pressure regulator 10 has a valve cylinder 11, in which a main valve spool 12 is located. Spool 12 has a main piston element 13 and a feedback or return piston 14. Spool 12, with its pistons 13, 14, is freely movable in axial direction. The main piston 13 has a control edge forming a control surface 15; the feedback piston 14 has a circular control surface 16. Cylinder 11 further includes a control slider or spool 17, which is formed in several steps, and has a circular ring-shaped surface 18 at the end thereof and another surface 19 of greater diameter. The two sliders, or spools 12, 17 are spaced from each other by means of a spiral spring 20.

Valve 21 provides a pressure which is representative of throttle position, and may be referred to as the throttle pressure valve. Throttle pressure valve 21 has a cylinder 22 in which a throttle pressure slider 23 is freely movable in axial direction. Throttle pressure slider 23 is biassed away from a piston 24 by means of a spiral spring 25. The piston 24 can be shifted axially in cylinder 22 by a cam 28. Cam 28 is held in fixed position on a shaft 29, secured in suitable fixed bearings, and is shifted in position by means of a flexible cable 30 which is coupled to the throttle of the engine (not shown). Similar to the main spool 12, the throttle spool 23 is formed with two control edges or surfaces 31, and a return or feedback surface 32. The main pressure valve 10 as well as the throttle pressure valve 21 are connected by a ducting or hydraulic pressure line system, which is formed to include a switching pressure line 33, 34, 35, a throttle pressure line 36, 37, and a control pressure line 38. The pressure controller 10 and the throttle pressure valve 21 further are formed with drain openings 39 to remove pressure fluid to a sump, not shown, which may, for example, be the oil pan of the transmission. The pressure line 33 is connected to a hydraulic pump 40, for example by a removable flange. The pump 40 is driven from the engine, not shown. Hydraulic pressure is taken from the sump or transmission pan by suction from a line, not shown, and is supplied to the pressure supply system lines 33, 34, 35 under pressure. A Venturi tube 41 is interposed in line 33. The control line 38 branches off at the throat of the Venturi.

Operation: Let it be assumed that the system has been operating for a sufficient period of time so that a pressure balance arises in the system. When the pressures are in balance, slider 12 and the control slider 17 will have the position shown in the drawings in FIG. 1. In this balanced position, the control pressure in the control line 38 and the throttle pressure in the throttle line 37 will have a combined pressure which is less than the force exerted by the spring 20. In this condition, therefore, the forces applied from the pressure line 35 on the ring surface 16 of the return or feedback piston 14 will be in balance with the spring force. The command pressure — actual pressure comparison — is carried out by the return or feedback piston 14 of the main spool 12. Axial sliding of the spool 12, with its control edge 15 opens and closes the opening between the piston 15 and the ring-shaped entry gap 42 more or less. Hydraulic fluid can be drained into the sump 43 essentially without back pressure. Hence, the pressures within the cylinder 11 will reach the balanced state as above described and in the positions shown in FIG. 1.

Let it now be assumed that the engine increases in speed. This results in an increase in the speed of the pump 40 and/or to an increase in the throttle pressure of the throttle line 37. The forces acting on the main slider or spool 12 thus cause shifting of the spool position until a new balance position is reached. On the one hand, a pressure will be exerted on the spool 12 which corresponds to the product of the surface 16 and the increased switching pressure, while the control slider 17 will have the sum of those pressures acting thereon formed by the increased throttle pressure and the increased control pressure times the respective effective surfaces 18, 19. Control slider 17 will abut the main slider 12. When balance condition again is reached between command pressure and actual pressure, then, at the new, increased motor speed or the new, changed throttle position, a new corresponding switching pressure will result.

In accordance with the present invention, the Venturi 41 is included in the switching pressure line 33, and the control pressure line 38 is branched off the throat of the Venturi. A portion of the static pressure is converted in the throat of the Venturi to velocity, so that the control pressure is always less than the switching pressure. The differential pressure is roughly proportional to the square of the speed of the fluid or, respectively, to the speed of the quantity of fluid being supplied and hence likewise roughly proportional to the square of engine speed. If the switching pressure remains constant, and the engine speed and hence the pump speed increases, the control pressure decreases, which results in a smaller switching pressure. The switching pressure thus is controlled by the loading on the engine, that is, by throttle position as determined by the position of the cam 28, transferred from the throttle by means of flexible cable 30, as well as by engine speed as determined by the speed of the pump 40.

The system of FIG. 1 has been explained in detail since it shows the entire overall system, and includes the inventive concept of a controlled pressure change arrangement. In the embodiment of FIG. 1 the Venturi 41, which provides a control pressure in line 38, acts additionally to provide fluid at throttle pressure in line 37 from the throttle vale 21, to the main spool 12.

Figure 2:
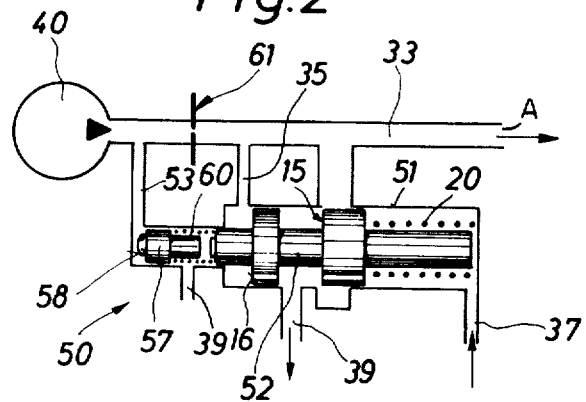
FIG. 2 is a highly schematic illustration of a system of the present invention using a diaphragm-type control.

Embodiment of FIG. 2: Parts similar to those explained in connection with FIG. 1 have been given the same reference numerals and will not be explained again in detail. Cylinder 51 of the pressure controller 50 has the main slider 52 therein which, as before, has a control edge 15 and a control surface 16, being a ring-shaped piston surface. Cylinder 51 further includes a control slider or spool 57, having a facing edge 58 on which a control pressure from line 53 is applied. The spring 60 between the two spools 52, 57 has the tendency to push the spools away from each other. The switching pressure line 33 has a diaphragm 61 included therein. Diaphragm 61, essentially, forms the difference between the embodiment of FIGS. 1 and 2.

Operation: Basically, the operation is similar to that of the system in accordance with FIG. 1. As the engine speed increases, however, the flow of fluid through the diaphragm 61, acting as a choke, or constriction, increases. A pressure difference then results, so that there will be a difference between control pressure and the smaller switching pressure, such that the switching pressure will likewise drop. The requisite minimum pressure which is necessary for lubrication and operation of the clutch of the gear transmission being connected is reached when the force of the spring 20 and of spring 60 plus the return or feedback force is in balance. The return or feedback force is obtained from the product of switching pressure times area of the ring surface 16. Locating the constriction in form of a diaphragm, or choke 61 converts change in speed into change in feedback pressure.

Figure 3:
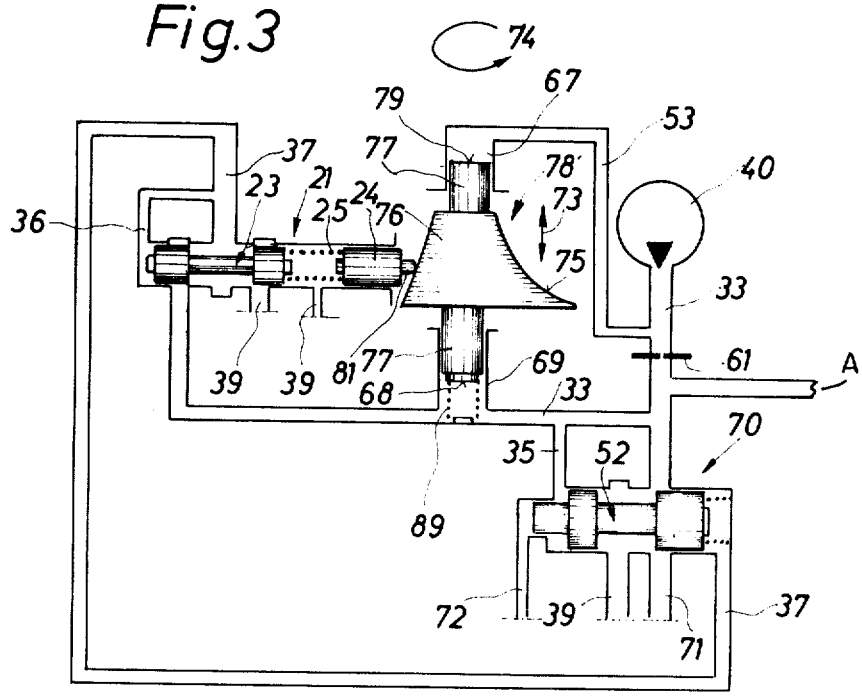
FIG. 3 is another embodiment of the invention using a three-dimensional cam.

Embodiment of FIG. 3: A diaphragm, or constriction, or choke 61 is located in the switching pressure line 33. The pressure controller 70 is influenced, in addition to the switching pressure and the throttle pressure, by the switching pressure over a line 72 which is controlled by a manually operated slider when forward motion is desired. Line 71 leads to this manual controller or valve. Further, the cam is formed as a three-dimensional cam 78 and is shaped to be a body of rotation, that is, a body rotatable about an axis or a shaft having a circumferential surface 75 forming a three-dimensional cam with three-dimensional curves. A cam follower 81 moves piston 24 counter the force of spring 25. The central shaft of the cam 78 includes two end pins 77 having respective facing surfaces 68, 79, which are guided in cylinders 67, 69 respectively. The cylinders 67, 69 are connected, respectively, with the switching pressure line 33 and the control pressure line 53 (corresponding to line 38, FIG. 1). The surface 68 on which the switching pressure 33 acts is supported by means of a spring 80. Rotary motion, in the direction of arrow 74 is obtained by means of a flexible cable (not shown); the axial motion of the three-dimensional cam, in the direction of arrow 73 is determined by the pressure difference between switching pressure and control pressure in lines 33, 53, respectively.

Operation: Basically, the operation in accordance with FIG. 3 is similar to that in the previously disclosed examples, with this difference: Pressure difference is converted into a mechanical force which changes the position of the three-dimensional cam 78, in the direction of arrow 73. The cam follower 81, therefore, moves over a distance determined by the particular curve applied thereto, in space, which is proportional to the pressure difference. The throttle pressure in the throttle line 37, and thus the switching pressure in the switching line 33 is consequently controlled. This system provides a throttle pressure which has a value proportional to the turbine torque.

Figure 4:
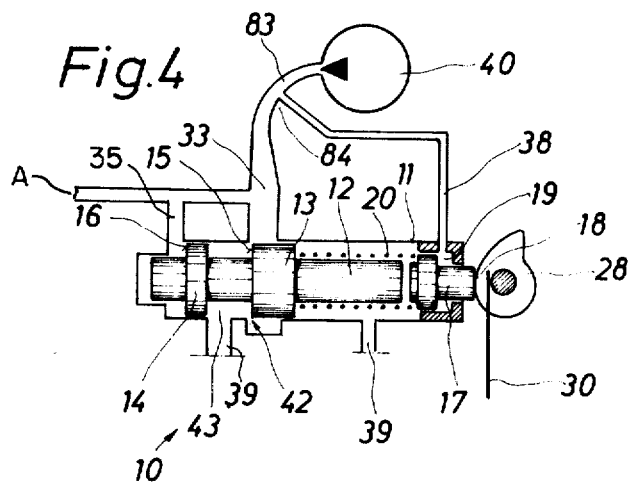
FIG. 4 is a schematic representation of another embodiment of the system of the present invention.

Embodiment of FIG. 4: This embodiment is similar to FIG. 1 with this difference: The throttle pressure valve 21 can be omitted, by so constructing the main valve that the cam 28 acts directly on the surface 18 of the control slider or spool 17. The control pressure line 38 is so connected in the cylinder 11 that the control pressure acts on the ring surface 19. This is a simplified arrangement, without a separate throttle pressure valve 21; the force on the cam, that is, the overall operating force must, however, be greater than in the preceding examples. The Venturi tube can be replaced by a deflection tube 83, in which the control line 38 branches off from the inner side of the deflection tube, applying the smaller pressure (with respect to the pressure in the switching line 33) to the control slider. If desired, a higher pressure can be taken off the outer side of the deflection tube 83, and the system connected similarly to the example described in connection with FIG. 2, or FIG. 3.

Various changes and modifications may be made within the scope of the inventive concept and features described in connection with any one of the embodiments may be used, within the scope of the invention, with any other of the embodiments.

The switching pressure, which in turn operates the gear changing mechanism is taken off the system at points A, indicated in the various Figures.

The invention, therefore, provides a means to supply a control pressure which acts in addition to the throttle pressure on the main slider; this means may be a diaphragm, a bent tube, or a Venturi. If the Venturi is selected, the control pressure and the throttle pressure act in the same direction on the spool of the main valve, so that the position of the main valve is changed in dependence on the sum of the control pressure and the throttle pressure. If a diaphragm is used, the control pressure and the throttle pressure are applied to the slider in opposition, so that the difference between the control pressure and the throttle pressure acts on the spool of the main valve to shift the position of the main valve spool. If a bent tube is used, either the sum, or the difference of the control pressure with respect to the throttle pressure can be used, depending upon whether the control pressure is taken off from the inside (FIG. 4) or the outside of the bent tube. The main slider, preferably, is formed in stepped arrangement so that the surfaces on which the various pressures act can be appropriately dimensioned with respect to the overall pressures applied thereto.

The turbine torque corresponding to the respective throttle positions in the upper speed ranges can readily be commanded by these systems. At low speed ranges, however, it is difficult to obtain such a torque and, therefore, the embodiment of FIG. 3 in which the cam is a three-dimensional cam, may be preferred. The cam, as known, is both axially movable as well as rotatable, the control pressure acting on one of the end surfaces of the cam and the switching pressure on the other. The difference between these two pressures then determines the particular instantaneous axial position of the three-dimensional cam element so that a switching pressure proportional to turbine torque is obtained.

The outlet A has fluid applied thereto which is controlled by suitable rings and grooves located on slider spool 12, to provide switching pressure, derived from the end of the line 33 in accordance with the position of the spool 12, with respect to drainage openings in the housing in which the spool is located.

I claim:

1. Apparatus supplying a gear changing or switching pressure, for use in vehicle transmissions, comprising:
   a pump (40) driven by the engine of the vehicle with a speed representative of engine speed, and a switching pressure line (33) connected to the pump and having arising therein a fluid switching pressure proportional to engine speed;
   a pressure controller (10) having a main valve slider (12), and feedback means (35, 14, 16) connected thereto and controlling the switching pressure;
   displaceable means (21, 28, 23, 37) changing position as a function of the change of position of the controller for the engine which controls engine speed and providing a force acting on the main valve slider (12) of the pressure controller, representative of engine controller position,
   the improvement comprising:
   a Venturi (41) located in the switching pressure line; and
   a control pressure line (38) branched off the throat of the Venturi to provide a pressure signal representative of flow of pressure fluid at the control pressure through the constriction;
   said control pressure line (38) and the displaceable means (21, 28, 23, 24, 37) providing a force representative of engine controller position acting on the main valve slider (12) such that the force representative of the control pressure and the force representative of engine controller position are applied to the main valve slider (12) in additive relation to change the position of the main valve slider as a function of the sum of said forces.

2. Apparatus according to claim 1, wherein the pressure controller (10) comprises a control slider element (17) having two control surfaces (17, 19), one of said surfaces (17) having fluid pressure representative of pressure in said control pressure line (38) applied thereto and the other (19) having a fluid pressure representative of engine controller position (30, 28; 24, 37) applied thereto.

3. Apparatus according to claim 1, wherein said pressure controller (10) comprises a control slider element (17) having at least one control surface to which a fluid pressure representative of pressure in said control pressure line (38) is applied, and said displaceable means comprises a cam (28) acting mechanically on said control slider element (17).

* * * * *